(12) United States Patent
Wang (10) Patent No.: US 7,163,619 B2
(45) Date of Patent: Jan. 16, 2007

(54) WATER SUPPLY SYSTEM AND MULTIFUNCTIONAL WATER SUPPLY TANK

(76) Inventor: Zerong Wang, Room 1, Unit 1, Building 2, No. 6, Ximenyinmahe, Chengdu, Sichuan (CN)

( * ) Notice: Subject to any disclaimer, the term of this patent is extended or adjusted under 35 U.S.C. 154(b) by 259 days.

(21) Appl. No.: 10/687,505

(22) Filed: Oct. 16, 2003

(65) Prior Publication Data

US 2004/0129625 A1 Jul. 8, 2004

Related U.S. Application Data

(63) Continuation-in-part of application No. PCT/CN02/00034, filed on Jan. 22, 2002.

(30) Foreign Application Priority Data

Apr. 16, 2001 (CN) ................................ 01 2 14735

(51) Int. Cl.
*C02F 9/10* (2006.01)
(52) U.S. Cl. ........................ 210/153; 210/202; 210/203; 210/181; 210/182
(58) Field of Classification Search ................ 210/153, 210/198.1, 202, 181, 203, 175, 182, 323.1, 210/323.2

See application file for complete search history.

(56) References Cited

U.S. PATENT DOCUMENTS 1,531,808 A * 3/1925 Parkinson .................... 210/181
4,704,202 A * 11/1987 Poyner ......................... 210/108
6,082,394 A * 7/2000 Lin .............................. 137/341
6,245,224 B1 * 6/2001 Enoki et al. .................. 210/87
6,393,775 B1 * 5/2002 Staschik ...................... 52/79.1

FOREIGN PATENT DOCUMENTS

| CN | 2238221 Y | 10/1996 |
|---|---|---|
| CN | 2286774 Y | 7/1998 |
| CN | 2300680 Y | 12/1998 |
| JP | 61-242232 | 10/1986 |

* cited by examiner

*Primary Examiner*—Duane Smith
*Assistant Examiner*—Douglas J. Theisen
(74) *Attorney, Agent, or Firm*—Greer, Burns & Crain, Ltd.

(57) ABSTRACT

The invention discloses a multifunctional water supply tank with pressure-stabilized water storage and quality-distinguished supply of service and potable water, which includes a service water storage room with a water inlet and a water outlet, a potable water storage room communicated with the service water storage room and containing purifying agents, a potable water outlet, and a water outlet communicated with a solar water heater, the present invention solves the problems of insufficient water pressure of tap water pipe network and the secondary water contamination during water supply by the pipe network, meanwhile it heats and preserves the temperature of the water supply tank cover and the water supply pipe walls, and separates pure water from service water, solar heated water, and purified potable water for separate metering and utilization.

14 Claims, 5 Drawing Sheets

WATER SUPPLY SYSTEM AND MULTIFUNCTIONAL WATER SUPPLY TANK

This application is a Continuation-In-Part of PCT/CN02/00034 having an International filing date of Jan. 22, 2002.

FIELD OF THE INVENTION

The invention relates to a water supply system and a multifunctional water supply tank, in particular to a water supply system with pressure-stabilized water storage and quality-distinguished supply of service and potable water.

BACKGROUND OF THE INVENTION

Water is the source of life, and is indispensable to our daily life. The water we use comes from a water source and is purified in waterworks, the purified water being then transported through a water duct to a water pressure-stabilizing water tower, where the water is branched to a water supply pipe network and goes to residential quarters for the daily use of inhabitants. The water pressure-stabilized water tower pressurizes the normally processed tap water and transports it to individual users. During transportation, the obsolete water pipe network and broken pipes will contaminate the tap water. It is very expensive and even impossible to totally avoid such contamination by digging the road to replace the obsolete pipes.

In recent years, with the development of industrial production and economy, people have an increasing consciousness and higher demands on their environmental sanitation. They put more and more demands on the quality of drinking water. A number of purifying devices such as home water purifiers and purifying systems, as well as bottled purified water appeared on the market. These products for drinking water, however, are only applicable to very few families and are unaccepted by most of the people due to their high price (more than 600–1000 yuan/ton water) and extremely inconvenient usage. Moreover, these household water purifiers are very liable to stoppage and are difficult to clean up.

A household multifunctional water storing and purifying device is disclosed in Chinese Patent CN-97209495, which is composed of a water tank, a water inlet filter, a water level-limiting float valve and associated pipes, and switch valves. The water is fed into the water tank through a high-level water inlet pipe and is stored in the water tank. This purifying device, however, is different from the present invention in its configuration and the way to solve the problem of very low water pressure during peak periods of city water consumption.

A water-purifying tank is disclosed in Chinese Patent CN-95228447, which contains a filter and a float valve disposed within the tank. The lower end of the filter is attached to an automatic water amount-adjusting valve and is connected with the float through a float connecting rod to automatically control the drinking water amount and filter and purify the drinking water.

SUMMARY OF THE INVENTION

It is one objective of the invention to overcome the shortcomings of the above-mentioned prior art by providing a water supply system with pressure-stabilized water storage and quality-distinguished supply of service and potable water.

It is another objective of the invention to provide a multifunctional water supply tank with pressure-stabilized water storage and quality-distinguished supply of service and potable water to solve the problems of insufficient water pressure of tap water piping network and the secondary water contamination during water supply by the pipe network, and to separate the service water from the purified potable water.

It is yet another objective of the invention to solve the problems of insufficient water supply pressure and the secondary water contamination without any extra investment in the reconstruction of old urban water piping networks. These and other objectives of the invention will now be further embodied and explained through the following detailed descriptions and explanations.

The objectives of the invention are solved through a water supply system with pressure-stabilized water storage and quality-distinguished supply of service and potable water. The system includes a multifunctional water supply tank with pressure-stabilized water storage and quality-distinguished supply of service and potable water, containing a service water storage room with a water inlet and a water outlet, a potable water storage room in communication with the service water storage room and containing purifying agents, a potable water outlet, and a water outlet in communication with a solar water heater. At least one filtering cylinder assembly is in communication with the potable water outlet through pipes being disposed outside the water supply tank with functions of magnetizing, fine filtering, water softening, increasing and reducing microelements, absorption, and super-filtering, etc. The system further includes a pipe valve, which is made of non-secondary-contamination material and is matched with the filtering cylinder assembly, and an instrument forming the purified potable water supply network mountable to users, and a pure water filter assembly outlet piping network instrument being added thereafter for high-standard industrial pure water processing and seawater desalination. The wastewater drained from the system can be recycled after being purified into neutral water.

The present multifunctional water supply tank with pressure-stabilized water storage and quality-distinguished supply of service and potable water and the purifying device and solar water heater of the water supply system with pressure-stabilized water storage and quality-distinguished supply of service and potable water can be located separately on a building's roof or ground in accordance with the building's height matched with the reachable height of the piping network water supply pressure. The equipment can be mounted in a way of either single function or multifunction. The under-pressure water supply is provided by an automatic frequency-converting pump, and the on-off operation of the system's water supply is automatically controlled by a central console.

The present multifunctional water supply tank with pressure-stabilized water storage and quality-distinguished supply of service and potable water includes a service water storage room with a water inlet and a water outlet, a potable water storage room in communication with the service water storage room and containing purifying agents, a potable water outlet, and a water outlet communicating with a solar water heater. The existing tap water piping network is in communication with the outlet of the potable water storage room, connecting the potable water outlet with household water purifiers and systems so that they cannot be stopped and are convenient to use. Alternately, it is possible to connect at the outlet of the potable water storage room via pipes at least one set of filtering cylinder assemblies and a (quality-distinguished) potable and service water supply piping network which is formed by non-secondary-contamination material and related instruments and is matched with the filtering cylinder assembly and a set of high-power solar water heaters as well as a hot water storage pot. The service water and the purified potable water as well as the pure water and the solar heated water can be separated and charged individually, making clear the difference between the potable water charges and the charges by the waterworks, and ensuring the realization of a quality-distinguished potable and service water supply system.

The service water storage room and the potable water storage room have a communicating hole at their separating wall. The potable water outlet is located at the upper part of the potable water storage room, the tap water is rebounded from the bottom of the service water storage room, enters into the lower part of the potable water storage room and is again rebounded up to the upper part of the room and finally flows out of the potable water outlet.

The purifying agents in the potable water storage room can be plastic-net filter bags containing quartz grits and an ozone supply tube connected to a ozone generator, the plastic-net filter bag being mounted in a movable plastic tube supporting frame. The supply tube is filled with a certain amount of ozone for killing bacteria and for disinfection. The number of filter bags can be 8–12, depending on requirements. The filter bags can be easily removed from the potable water storage room at any time for cleansing.

One end of the service water storage room is connected with the ozone supply tube and the other end is plunged into an ozone branch supply tube at the bottom of the filtering bags in the service water storage room.

The service water storage room has a float-type automatic switch valve at its inlet.

Outside the water supply tank is located a glass-visualized water level gage and an overflow tube, with which the water level within the tank can be known and an overflow can be carried out through the overflow tube in the case of a fault with the inlet float switch valve.

A sewage draining valve is individually disposed at the bottom of the service water storage room and that of the potable water storage room, and the drained sewage is collected in a sewage pool and a cleansing pool where it is deposited and filtered into neutral water which is then collected into a neutral water storage tank connected with an underground neutral water pool for recycling.

At the bottom of the water storage tank, there are two inclined foam concrete-filled temperature-preserving layers at either side of the sewage draining holes, and on the foam concrete-filled temperature-preserving layer there is a stainless steel plate cover, making the cleansing and the drainage easier and ensuring heat preservation at the bottom.

The wall, cover and the outlet pipes connected with the water outlet of the water supply tank are individually made of successively-connected light steel plate, wire-net and concrete, or an inner wall stainless steel with a micro electrically-heated layer and a temperature-preserving foam concrete as well as a foam plastic temperature-preserving layer. The micro electrically-heated layer is composed of a 36V DZR micro heating film or plate and an isolating film, keeping the water temperature within 5–23° C., and is automatically switched by a connected temperature-sensitive wire and a temperature-controlling relay to prevent from freezing and preserve the heat. In the northern part of China, it is necessary to heat to prevent freezing, whereas in the south, only the functions such as heat-preservation, UV protection are required.

A clean water-circulating return tube is connected with the upper part of the potable water storage room and an electromagnetic valve and a pump at the bottom are actuated by a timer to ensure a fresh and clean water supply.

A decorative safeguarding fence is provided outside the water supply tank.

The present water supply tank can be mounted on roofs, and can thus operate by use of water potential energy to save energy consumption. For low-story buildings with sufficient water pressure, the water supply tank can be located in a ground floor room and utilizes the water pressure to transport the water to individual users. It is also possible to install the water supply tank, the water purifying device and the solar water heater on building roofs or ground floors separately and in ways of single function or multi functions according to different requirements. In the case of insufficient sunshine, an electrical water heater installed at the rear of the household hot water meter can be used to make up for the shortage of hot water.

Figure 1:
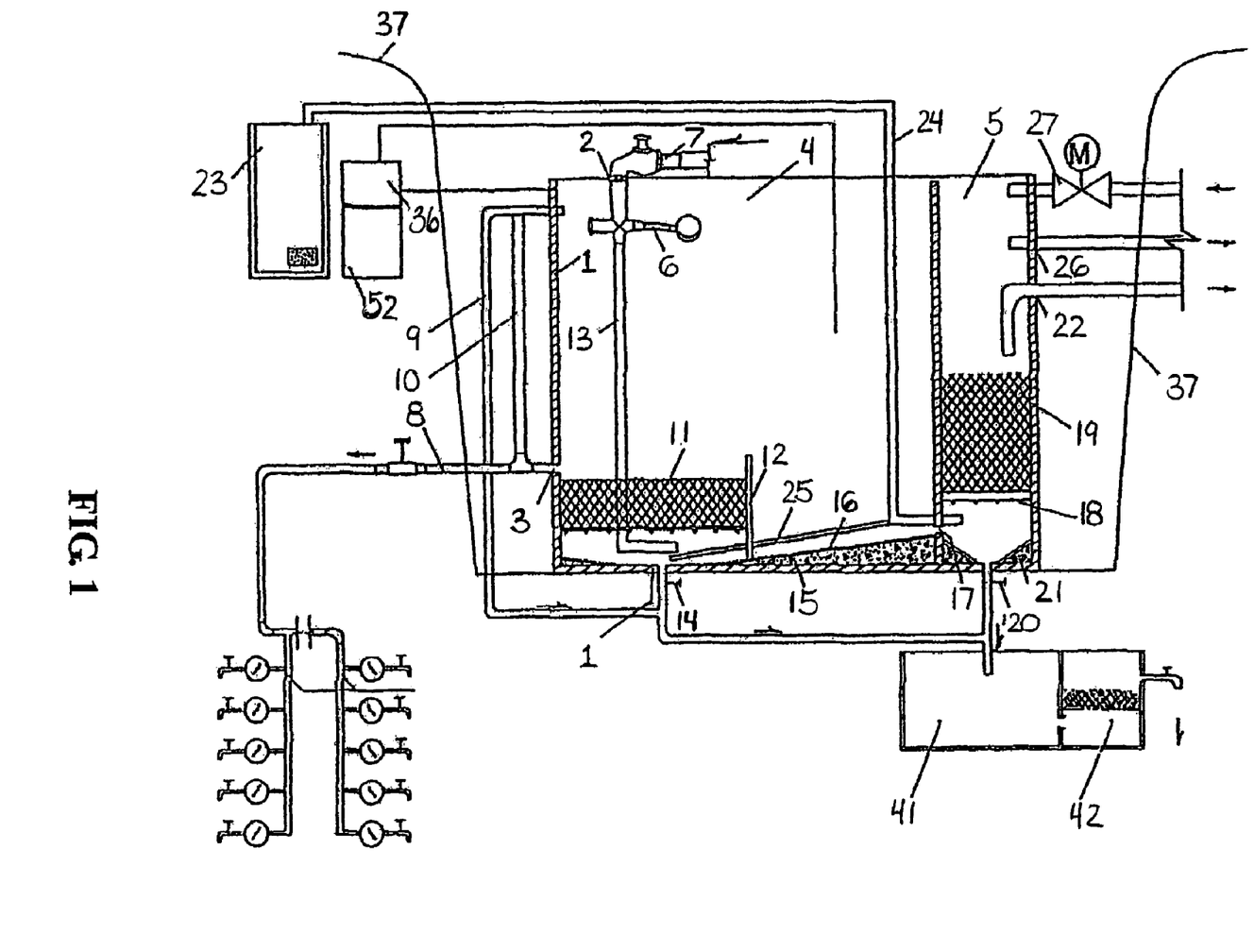
FIG. 1 is a schematic diagram of the configuration of the water supply tank according to the invention.
Figure 7:
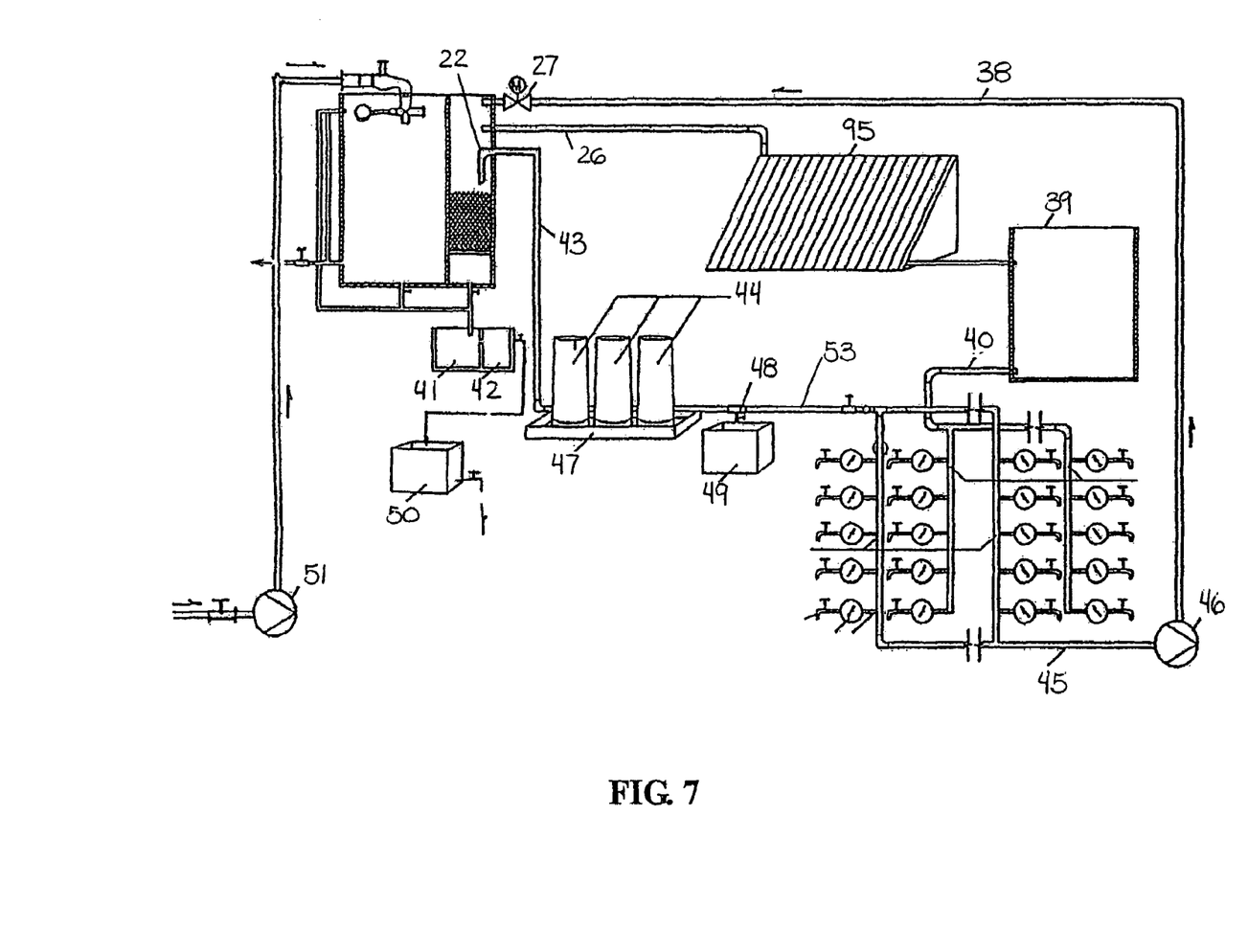
FIG. 7 is a schematic diagram of the water supply system with pressure-stabilized water storage and quality-distinguished supply of service and potable water according to the invention.

Referring now to FIGS. 1 and 7, the present multifunctional water supply tank with pressure-stabilized water storage and quality-distinguished supply of service and potable water is connected with an urban water supply piping network, switched on automatically by a float switch valve and entering into the water storage room, supplying water in 4 pipes (the neutral water and the neutral water storage tank operating independently).

For potable water, as shown in FIG. 7, the water goes through two sets of large-capacity water purifying and filtering cylinder assemblies (with one spare purifying and filtering cylinder assembly), a sewage draining pool, a cleansing pool, and a water supply main pipe into a unit water supply branch pipe, where it enters into a household water supply pipe and goes through a water meter, a potable water pipe and valves for drinking. For buildings that are difficult to reconstruct with independent household water supply services, it is possible to establish a central water sales station using the system of the invention, providing sporadically pure water and electrically-heated hot water.

For service water, as shown in FIGS. 1 and 7, the water goes through a water supply main pipe and a float valve into the bottom of the water storage room, where it is processed firstly by sand filtering bags and ozone-disinfected and enters into a main water pipe, a unit branch pipe, from there it enters into household water supply pipe and goes through water meters and finally reaches individual household water appliances. If the building is a reconstructed old building, the original water storage tank, with reference to FIG. 7, can be reconstructed as a service water storage room, the service water can be directly connected into the original water-piping network. With an additional potable water storage room, the original water storage tank can then become a multifunctional water supply tank.

For solar heated water, the system is utilized in the areas with sufficient sunshine. The water goes through the piping shown in FIGS. 1 and 7, and enters into a large-power solar water heater from the upper part of the potable water storage tank, where the water is heated and goes into a hot water-preserving storage pot, and enters then into a temperature-preserving hot water main pipe, a unit branch pipe, a hot water meter and finally reaches household water appliances for the use of washing and bathing.

For industrial pure water, a pure water filter assembly and a water supply network instrument are arranged behind the potable water-piping network at the utilization location for providing high-standard industrial pure water. The system can also provide the function of seawater desalination.

For neutral water, the sewage drained from the system is purified into neutral water which is then stored in an independent neutral water tank. The neutral water is then communicated with neutral water, which is formed of roof rainwater, ground surface rainwater and life sewage collected and processed up to the standard by a sewage collecting pool whose base part is arranged underground, to be recycled for toilet flushing, flower watering, outdoors cleaning, and residential quarters landscaping. The residual neutral water can be directly drained into rivers and lakes, and underground water-containing layers. The concentrated human waste remaining after the processing will be collected and transported to a suburb refuse dump, where they are further processed to become fertilizers.

In rural areas, the ground surface water and the well water accumulated in mountain ponds and lakes will be provided as high-quality potable and service water as well as the irrigation water for crops after they have been processed in a quality-distinguished fashion by the system of the invention.

With the above-mentioned water supply system, it is possible to reconstruct the unitary residential building and building groups, and the system can be installed directly in the residential quarters both already constructed and newly planned with the only requirement that the water consumption amount be designed in a calculable basis and be arranged systematically. The clear relationship between the quality-distinguished water supply operation management and the operation management of the city tap water company ensures that the water income of the city tap water will not be harmed. The timely cleansing and the maintaining of the water quality is managed by special persons from the specialized water-cleaning engineering company, and each household water meter will be checked and the water consumption charged, ensuring a return of the investment and a long-term water supply operation. Thus, the water-drinking needs of urban inhabitants can be solved easily under the circumstances of no investment from the state, and people have cheap, fresh and clean magnetized potable water without the damage of water borne contaminants. The price of the water is much lower than that sold on the market, preserving the water and promoting the sanitation of water drinking and people's health. The present system is easy to install and does not require the reconstruction of the old urban water supply network. Cost for the engineering equipment installation is relatively low.

The present water supply system with pressure-stabilized water storage and quality-distinguished supply of service and potable water can ensure a sustainable use of water resource, and becomes therefore a feasible means for speeding up the reforms of water drinking and utilization in our country. The present water supply system with pressure-stabilized water storage and quality-distinguished supply of service and potable water connects the urban tap water pipes with the automatically-switched pressure-stabilized water storage tank for potable and service water on the building roof, and is then connected in two ways to the large-capacity water purifying system with service water pipe and potable and pure water pipes. From there, the water is transported to individual residential household and industrial water meters through pipes and equipment made of non-contaminated new materials.

The present water supply tank and system can solve the problems of insufficient tap water pressure and the quality-distinguished water supply as well as the water purification of the contaminated water after going through the water piping network. Potable water, service water, and solar heated water are made to flow separately and are utilized economically, resulting in a drastic saving in water resource and energy, ensuring a safe and sanitary drinking water and promoting people's health. The system according to the invention can be constructed rapidly, without the necessity in breaking ground and paving new pipe networks, thus casting little negative influence, requiring only lower costs and saving the investment with very good processing effects and economical and social profits. Further, the present invention is suitable to the reconstruction of the present urban water supply network to improve the quality of drinking water.

For the recycling of the neutral water according to the invention, a suitable area is selected in the residential quarters for constructing a neutral water collecting pool for sewage and rainwater. The second underground layer of the pool body consists of a neutral water collecting pool and a neutral water processing room. The first underground layer of the pool body consists of a pool for collecting, processing and depositing rainwater and a pool for collecting, biochemical processing and depositing residential sewage. The ground surface serves as a parking lot or lawn. The roof rainwater, ground surface rainwater and sewage of the residential quarters are collected and flow into the rainwater pool and the sewage pool respectively. The sewage, after being processed biochemically and deposited, flows into a buffer pool and is again deposited and filtered there. The respectively-processed water becomes up-to-standard neutral water after being filtered and separated once again and flows then into the individual neutral water storage pools where the neutral water, according to requirements, is pumped into a neutral water tank by a frequency-converting pump and enters the piping network, or it enters the neutral water pipe and serves as the recycled water for toilet flushing, flower watering and residential quarters landscaping. The residual neutral water is drained directly into rivers and lakes and the underground water-containing layers. The concentrated human waste remaining after the processing will be sucked by a pump into a refuse truck and transported to a suburb refuse dump, where it is further processed to become fertilizer.

Residential sewage contains relatively simple components and is easy to process. The sewage and the rainwater can be processed locally, changing the processing in a large processing plant into a mode of segmented processing and resulting in a saving in capital investment and reduced processing costs as well as an expedient localized water recycling and an economized utilization of water resource. The up-to-standard water of Grades II and III are then drained directly into rivers and lakes, ensuring clarity of river water and increasing water volumes, and is therefore beneficial to water recycling in downstream areas. For areas with no rivers and lakes, deep wells can be used to drain the water into water-containing underground layers to replenish underground water, forming a large scale circulation of economized water resource utilization.

The invention can solve the problem of insufficient tap water pressure and secondary contamination in the water piping network, distinguishing between service water, purified potable water, solar heated water, recycled neutral water and residential sewage.

BRIEF DESCRIPTION OF THE DRAWINGS

The invention will now be further described and explained in accordance with the accompanied figures.

DETAILED DESCRIPTION OF THE PREFERRED EMBODIMENTS

The invention will be further illustrated in accordance with the following practical embodiments, which are used only for the illustrations and cannot be taken as limiting the scope of the present invention.

The first embodiment of the present invention is referred to in FIGS. 1–6. A water supply tank 1 is composed of a service water storage room 4, which contains a water inlet 2 and a water outlet 3, and a potable water storage room 5. A float-type automatic switch valve 6 is arranged at the inlet 2 within the service water storage room 4. The water supply tank 1 has an inlet on its upper part, which is in communication with a tap water inlet pipe 7 containing a valve, and a service water pipe 8 disposed at its lower part. An overflow pipe 9 is in communication with the upper part of the service water storage room 4. A water level pipe 10 is in communication with the overflow pipe 9 and the service water pipe 8. A movable plastic tube 11 containing purifying agents, quartz grits bags 19, and a separating supporting frame 12 are disposed at the outlet 3. One end of a water pipe 13 connected with the inlet 2 extends through the movable separating supporting frame 12 into the bottom of the storage room 4. A first sewage-draining valve 14 is arranged at the bottom of the storage room 4. On either side of the valve 14 is disposed an inclined foam concrete-filled temperature-preserving layer 15, whose surface is covered with a thin stainless steel plate 16. A through hole 17 is disposed at the lower part of the wall between the service water storage room 4 and the potable water storage room 5 to connect the two rooms. A movable plastic tube-supporting frame 18 is disposed in the potable water storage room 5, with the quartz grits bags 19 arranged thereon. On either side of a second sewage draining valve 20 at the bottom of the potable water storage room 5 is disposed an inclined foam concrete-filled temperature preserving layer 21, whose surface is covered with a thin stainless steel plate. An ozone supply tube 24, having one end in communication with an ozone generator 23, extends through the service water storage room 4 into the bottom of the movable plastic tube in the potable water storage room 5. An ozone branch supply tube 25 communicating with the ozone supply tube 24 extends to the outlet at the bottom of the movable plastic tube and the separating supporting frame 12. In the upper part of the potable water storage room 5 are disposed a potable water outlet 22, an outlet 26 connecting with a solar water heater, and a timed and electrically-controlled valve 27 for the returned circulating purified water, which is started by an automatic control device 52.

Figures 2, 3, 8:
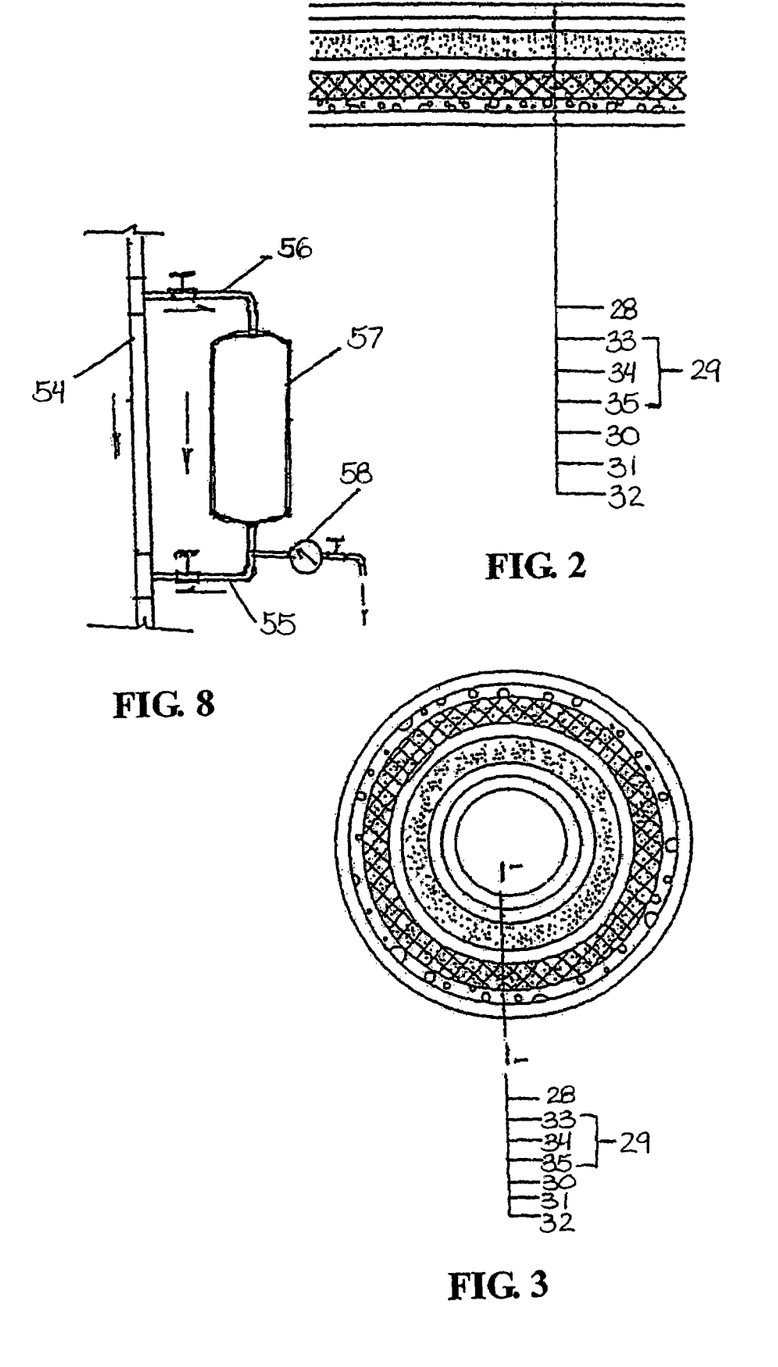
FIG. 2 is a schematic diagram of the temperature-preserving layer for the wall cover and the pipe wall of the water supply tank according to the invention.
FIG. 3 is a schematic diagram of the configuration of the temperature-preserving layer for the water pipe of the water supply tank according to the invention.
FIG. 8 is a schematic diagram showing the flow chart of the piping operation for the household water storage pot and the water meter according to the invention.
Figure 4:
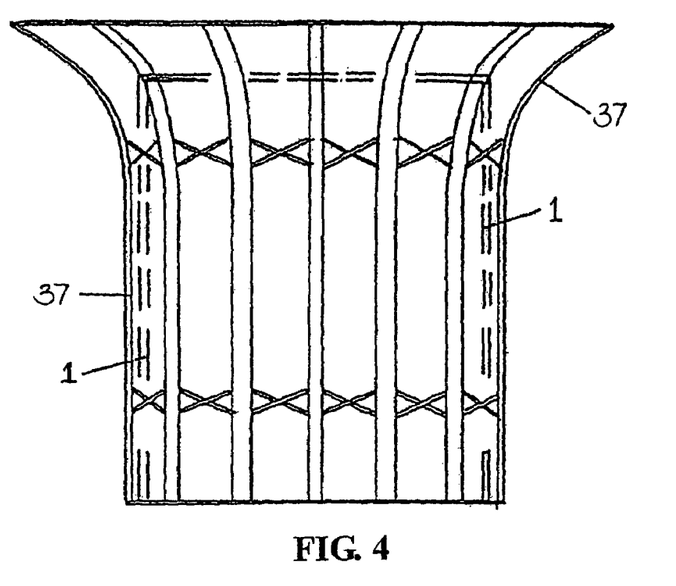
FIG. 4 is a schematic diagram of the decorative safeguarding fence outside the water supply tank according to the invention.
Figure 5:
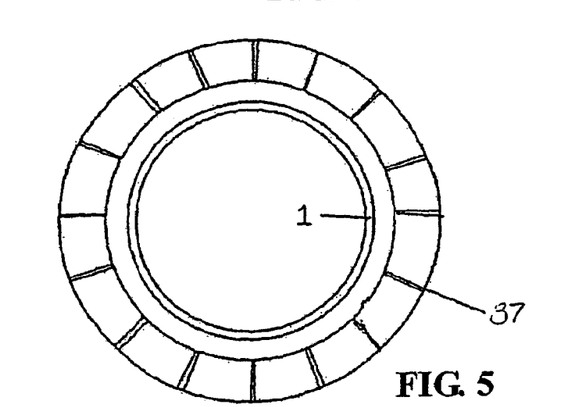
FIG. 5 is a plan view of the decorative safeguarding fence (Type A) outside the water supply tank according to the invention.
Figure 6:
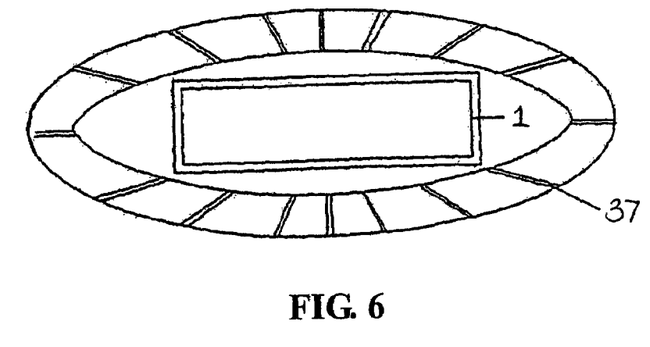
FIG. 6 is a plan view of the decorative safeguarding fence (Type B) outside the water supply tank according to the invention.

Referring now to FIGS. 2 and 3, the wall cover of the water supply tank 1 and the water pipe wall are composed respectively of a stainless steel plate 28, a micro electrically-heated temperature-preserving layer 29, a temperature-preserving foam concrete layer 30, a polymer foam plate 31, and a temperature-preserving light-reflecting surface film 32, which are connected in succession. The micro electrically-heated temperature-preserving layer 29 includes a heat-isolating film 33, a 36V micro electrically-heated film or plate 34, and an insulating film 35, the micro electrically-heated temperature-preserving layer being connected with a temperature-sensitive relay switch 36 (FIG. 1). A decorative safeguarding fence 37 is provided outside the water supply tank 1.

The second embodiment of the present invention is referred to in FIG. 7. The invention utilizes the water tank 1 of the first embodiment. In a purified water storage room, the timed and electrically-controlled valve 27 has a returned circulating purified water pipe 38. A solar water heater 95 is connected to a temperature-preserving hot water reservoir 39, which is again connected with a branch hot water pipe 40 to various households. The sewage drained from the second sewage draining valve 20 can be processed into neutral water after being deposited and filtered in a sewage pool 41 and a depositing pool 42, the neutral water flows then into a neutral water storage tank 50 in communication with an underground neutral water pool for circulation and recycling. The potable water from the potable water outlet 22 goes through a potable water pipe 43 and a multi-stage filtering cylinder assembly 44 and enters a purified branch pipe 53 for users, where it is divided into two groups, one group bypassing a main branch pipe 54 to household users.

FIG. 8 shows the main branch pipe 54 and the bypassed water flowing into a household pipe 56 connected with a sealed water storage reservoir 57 which can be switched on by household users (volume: 20–30 liter). The bypassed water flow goes through a household remote automatic purified-water meter 96 and a valve, and can be used by the users. Another bypassed flow enters a purified water filtering assembly through a branch pipe 55, where it is processed into pure water for use in industrial production. The system according to the invention can also be used as equipment for seawater desalination. The sewage drained from the filtering cylinder assembly of the multi-stage filtering cylinder assembly 44 is concentrated in the sewage pool 41 for further processing. The returned water flows through a backwater pipe 45 and returns into the circulating water purified pipe 38 after being activated by a pump 46 and the timed electrically-controlled valve 27. A collecting tray 47 is disposed below the multi-stage filtering cylinder assembly 44; a valve 48 is disposed thereafter on the potable water pipe 53 to let the water in a cleansing pool 49 for cleansing the filter. The sewage produced from the cleansing is then drained into the sewage pool 41 for processing. When the water storage tank 4 or storage equipment is arranged on the roof, the complementary water supply made up for insufficient water pressure will be provided by a frequency-converting pump 51 through water piping. All the automatic controls of the system are executed in a central console.

Figure 9:
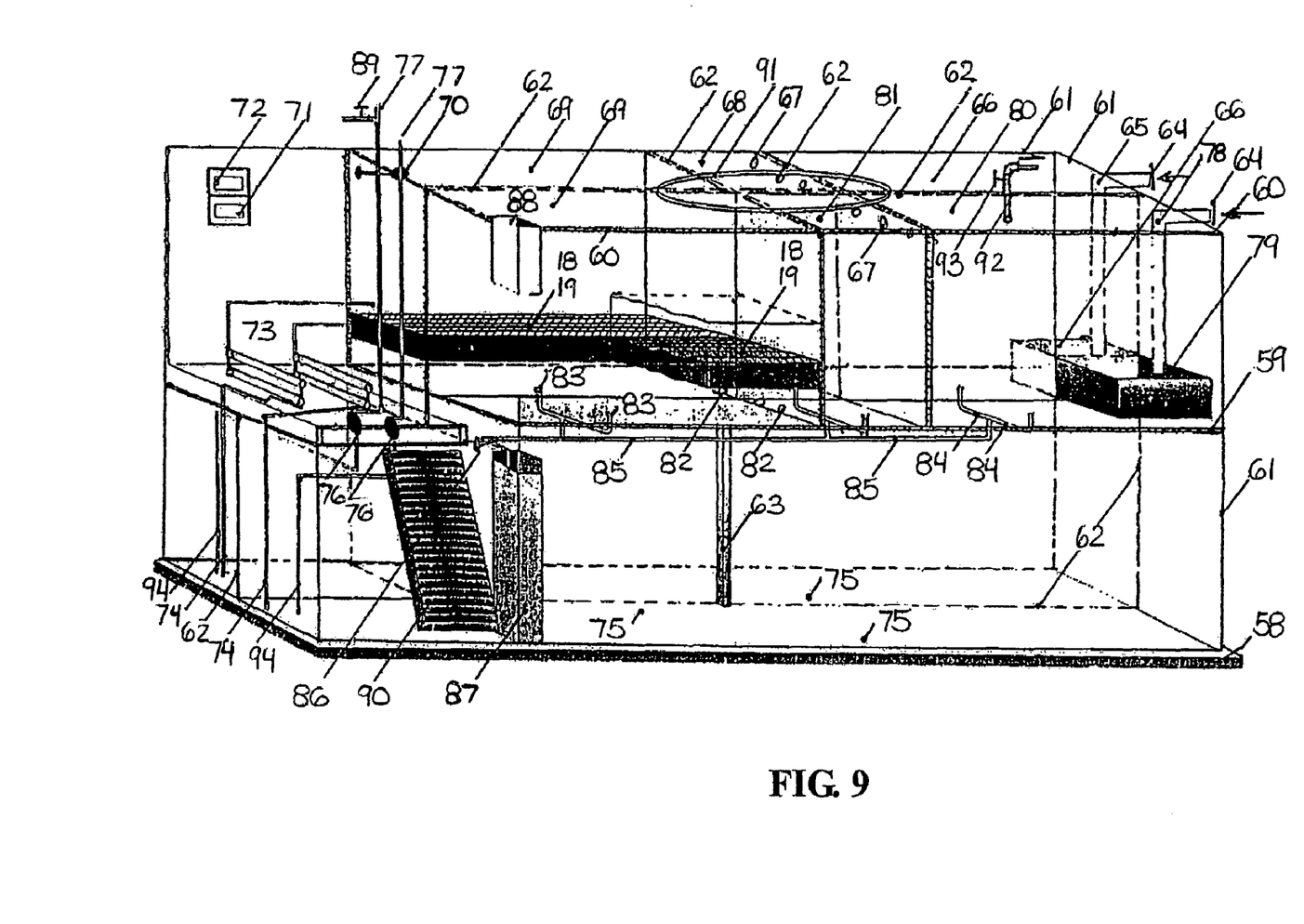
FIG. 9 is a schematic diagram showing the flow chart of the central processing pool for ground surface water and life sewage in residential quarters according to the invention.

FIG. 9 shows the flow chart of the central processing pool for ground surface water and life sewage recycled in residential quarters or the third embodiment according to the invention. The third embodiment utilizes the water supply tank 1 of the first embodiment and the quality-distinguished water processing system of the second embodiment. A two-story central processing pool for life sewage and rainwater is constructed by casting with anti-infiltration reinforced concrete in a suitable area in residential quarters. The pool body is separated into independent processing pools communicated with each other by a base plate 58, a floor plate 59, a top plate 60, a multiplicity of pool walls 61 and separating walls 62, a separating plate pillar 63, and a staircase 90. The ground surface water flows into a rainwater pipe 65 through a sewage fence 64 and is filtered primarily and deposited in a first depositing pool 66. The resulted clear water flows through an overflow hole 67 at the pool separating plate into a buffer pool 68, where it deposits and flows into a fine filtering pool 69 from the lower part of the pool separating plate, and is reboundedly filtered through movable filtering beds 18, 19. When the water level reaches a float level indicator 70, a console 71 actuates an ozone generator 72, and the ozone flows through the buffer pool 68 to the fine filtering pool 69 and a neutral water storage pool 75 for disinfection. Meanwhile a super-filtering machine 73 operates to process the water into an up-to-standard neutral water, which flows then through an outlet pipe 74 into the neutral water storage pool 75 at the bottom of the pool for storage. In use of neutral water, a central console actuates a frequency-converting pump 76 to flow through a suction water pipe 94 to the neutral water storage pool 75, through the control of a neutral water-recycling pipe 77 and a bypass valve 89, and connect it with the water piping network in residential buildings for recycling. The residual neutral water can be directly drained into nearby rivers and lakes or underground water-containing layers. Residential sewage flows into a sewage pipe 78 through the sewage fence 64 to a decomposing pool 79 for decomposition and flows into a buffer pool 81 from the upper part of the pool separating plate after being decomposed and deposited in a biochemical processing tank 80, where it is again deposited and flows into the fine filtering pool 69 through a communicating hole 82 located in the lower part of the pool separating plate, where it is filtered by a rebounded movable filtering bed, disinfected with ozone and super-filtered, and flows then into the neutral water storage pool 75 for storage. The two streams of up-to-standard neutral water are pumped and communicated for recycling. All the dirt and sewage deposited at the pool bottom are drained into a sewage draining branch pipe 84 through a sewage draining hole 83 in the middle of an inclined plate, and enter a main pipe 85 whose operation is controlled by a sewage draining pipe valve 86. An inspection opening cover 91 is disposed on the top of the pool, through which movable filtering beds and facilities in inner pool walls are cleaned and maintained. Water pressure is used to sweep the sewage into a sewage well 87. A slurry pump is dropped through a sewage well mouth 88 into the well bottom to suck the sewage collected at the bottom into a refuse truck, and the sucked sewage is transported to the suburb refuse dump, where it is processed into fertilizer for crops. The marsh gas generated in the biochemical processing of sewage is controlled by a valve for a drainage and supply pipe 92 at the top of the biochemical processing pool and a marsh gas concentration-controlling valve 93, and is fed through gas supply pipes to households.

What is claimed is:

1. A water supply system with pressure-stabilized water storage and quality-distinguished supply of service and potable water, including a plurality of pipe valves, a plurality of instruments and a water supply piping network, the system further including:
   a multifunctional water supply tank with pressure-stabilized water storage and quality-distinguished supply of service and potable water;
   at least one filtering cylinder assembly and a water supply piping network for a purified water filter assembly, where said filtering cylinder assembly is in communication with a potable water outlet through a plurality of pipes and is provided outside said water supply tank, and the pipe valves and instruments corresponding with said filtering cylinder assembly form a purified potable water supply piping network mountable in households;
   said purified water filtering assembly, the water supply piping network and the plurality of instruments being configured for the use of high-standard industrial pure water processing and seawater desalination, wherein sewage drained from the system is purified into neutral water.

2. The water supply system according to claim 1, and further including a purifying device and a solar water heater wherein said multifunctional water supply tank and said purifying device and solar water heater can be located separately on a building's roof or a ground floor in accordance with a height of the building matched with a reachable height of the water supply pressure in the piping network, the system being mounted in a way of either single function or multifunction, and a central water sales station being established for buildings that are difficult to reconstruct with independent household water supply services to sporadically provide pure water and electrically-heated water.

3. The water supply system according to claim 2, wherein a household water storage pot with a volume of 20–30 liters is connected to a unit water supply branch pipe and is provided in front of a household potable water inlet pipe and behind a water meter for collecting water during city water consumption, the system being provided complementarily with water by an additional electric water heater and a frequency-converting water pump.

4. A multifunctional water supply tank with pressure-stabilized water storage and quality-distinguished supply of service and potable water, including a service water storage room in communication with a potable water storage room and containing purifying agents, a potable water outlet, a water outlet communicating with a solar water heater, and a separating wall between said service water storage room and said potable water storage room, wherein a through hole is provided in said separating wall, said potable water outlet being located in an upper part of said potable water storage room.

5. The multifunctional water supply tank according to claim 4, wherein said purifying agents include plastic-net filtering bags containing quartz grits, an ozone supply tube having an end extending outside the tank and connected with an ozone generator, the plastic-net filtering bags being disposed in a movable plastic tube supporting frame.

6. The multifunctional water supply tank according to claim 4, further including a plurality of filtering bags and an ozone branch supply tube, said tube having one end in communication with an ozone supply tube and another end extending into a bottom of said filtering bags in said service water storage room.

7. The multifunctional water supply tank according to claim 4, wherein said service water storage room includes an inlet having a float-type automatic switch valve, a glass-visualized water level gage and an overflow pipe located outside the water supply tank, and a first and a second sewage draining valve individually disposed at a bottom of said service water storage room and that of said potable water storage room, respectively.

8. The multifunctional water supply tank according to claim 4, wherein at a bottom of said service water storage room and said potable water storage room, two inclined foam concrete-filled temperature-preserving layers are disposed at either side of a first and a second sewage draining valve, respectively, and a stainless steel plate is covered on one of said two foam concrete-filled temperature-preserving layers.

9. The multifunctional water supply tank according to claim 4, further including a water tank wall, a tank cover, and a plurality of outlet pipes connected with said water outlet, said water tank wall, said tank cover and said outlet pipes being individually made of a light steel plate-wire-net-concrete layer or a stainless steel inner wall, a micro electronically-heated layer, a temperature-preserved foam concrete layer, a polymer temperature-preserving heat-isolating layer, and a temperature-preserving light-reflecting surface film, the micro electrically-heated layer being composed of a heat-conductive isolating film, a 36V micro electrically-heating film or plate, and an isolating film, which are connected in succession.

10. The multifunctional water supply tank according to claim 4, wherein a purified water-circulating return pipe is connected to an upper part of said potable water storage room.

11. The water supply system according to claim 1 further including a neutral water recycling two-story structure disposed under a parking lot or lawn in a residential area for a separate processing of collected life sewage, roof rainwater and ground surface rainwater, said structure being provided with a sewage fence and being constructed by casting with anti-infiltration reinforced concrete, said structure further having a biochemical processing pool with a through hole, a depositing pool, a buffer pool, a rebounded filtering pool, a neutral water-classifying storage pool, a sewage-draining water-collecting well, a quality-distinguished super filtering machine and neutral water recycling pipes as well as a frequency-converting pump house connected with a plurality of water draining pipes and a pipe valve located on a top of said biochemical processing pool for marsh gas drainage and supply, a float position-limiting device connecting an electric switch to switch on or off an ozone disinfector and a quality-distinguishing super filtering machine, a slope being arranged in an upper part of said pool, said upper part being provided with sewage draining pipes and valves connected with said sewage-draining water-collecting well for sewage drainage.

12. The multifunctional water supply tank according to claim 5, further including an ozone branch supply tube, having one end in communication with said ozone supply tube and another end extending into a bottom of said filtering bags in said service water storage room.

13. The water supply system according to claim 2, further including a neutral water recycling two-story structure disposed under a parking lot or lawn in a residential area for a separate processing of collected residential sewage, roof rainwater and ground surface rainwater, said stricture being provided with a sewage fence and being constructed by casting with anti-infiltration reinforced concrete, said structure further having a biochemical processing pool with a through hole, a depositing pool, a buffer pool, a rebounded filtering pool, a neutral water-classifying storage pool, a sewage-draining water-collecting well, a quality-distinguished super filtering machine and neutral water recycling pipes as well as a frequency-converting pump house connected with water draining pipes and a pipe valve located on a top of the biochemical processing pool for marsh gas drainage and supply, a float position-limiting device connecting an electric switch to switch on or off an ozone disinfector and a quality-distinguishing super filtering machine, a slope being arranged in an upper part of said pool and being provided with sewage draining pipes and valves connected with the sewage-draining water-collecting well for sewage drainage.

14. A multifunctional water supply tank with pressure-stabilized water storage and quality-distinguished supply of service and potable water, including:
 a service water storage room in communication with a potable water storage room and containing purifying agents including a plurality of filtering bags;
 a potable water outlet;
 a water outlet communicating with a solar water heater;
 an ozone branch supply tube, having one end in communication with an ozone supply tube and another end extending into a bottom of said filtering bags in said service water storage room; and
 a separating wall between said service water storage room and said potable water storage room, wherein a through hole is provided in said separating wall, said potable water outlet being located in an upper part of said potable water storage room.

* * * * *